(12) United States Patent
Marine et al.

(10) Patent No.: US 12,019,626 B1
(45) Date of Patent: Jun. 25, 2024

(54) ITERATIVE SEARCH TOOL AND USER INTERFACE

(71) Applicant: Iterative Search LLC, Monument, CO (US)

(72) Inventors: Larry Dean Marine, Colorado Springs, CO (US); John M. Ireland, Midlothian, VA (US); Michael Kobar, Old Lyme, CT (US)

(73) Assignee: ITERATIVE SEARCH, LLC, Monument, CO (US)

( * ) Notice: Subject to any disclaimer, the term of this patent is extended or adjusted under 35 U.S.C. 154(b) by 368 days.

(21) Appl. No.: 17/391,469

(22) Filed: Aug. 2, 2021

Related U.S. Application Data

(63) Continuation-in-part of application No. 15/214,119, filed on Jul. 19, 2016, now Pat. No. 11,080,343.

(60) Provisional application No. 62/231,883, filed on Jul. 20, 2015.

(51) Int. Cl.
*G06F 16/242* (2019.01)
*G06F 16/11* (2019.01)
*G06F 16/248* (2019.01)
*G06F 16/9032* (2019.01)

(52) U.S. Cl.
CPC ........ *G06F 16/2425* (2019.01); *G06F 16/113* (2019.01); *G06F 16/248* (2019.01); *G06F 16/90324* (2019.01)

(58) Field of Classification Search
CPC .......... G06F 16/2425; G06F 16/90324; G06F 16/113; G06F 16/248
See application file for complete search history.

(56) References Cited

U.S. PATENT DOCUMENTS

| | | | | |
|---|---|---|---|---|
| 2011/0191314 A1* | 8/2011 | Howes | ................... | G06Q 30/02 707/706 |
| 2015/0234813 A1* | 8/2015 | Knapp | ................... | G06F 16/14 707/722 |
| 2016/0132720 A1* | 5/2016 | Klare | ................... | G06V 40/171 382/118 |
| 2016/0224531 A1* | 8/2016 | Robichaud | .......... | G06F 16/2477 |

* cited by examiner

*Primary Examiner* — Amy Ng
*Assistant Examiner* — Dustin D Eyers
(74) *Attorney, Agent, or Firm* — McCormick, Paulding & Huber PLLC

(57) ABSTRACT

A search tool including a user interface provides functionality organized to support iterative search tasks for software or browser-based searches. These features may be combined with existing software and browser-based search engines to provide more extensive search features that are otherwise unsupported by existing search engine user interfaces. The user interface can be applied to varying search domains, from constrained search environments, such as a corporate database, or to the Internet. Additionally, the search tool may include a project tool to provide one or more searchers the capability to access, leverage, and/or collaborate on iterative searches.

18 Claims, 13 Drawing Sheets

ITERATIVE SEARCH TOOL AND USER INTERFACE

CROSS-REFERENCE TO RELATED APPLICATIONS

This application is a continuation-in-part which claims the benefit under 35 U.S.C. § 120 of U.S. patent application Ser. No. 15/214,119, filed on Jul. 19, 2016, which claims the benefit under 35 U.S.C. § 119(e) of U.S. Provisional Patent Application No. 62/231,883, filed on Jul. 20, 2015, each of which is hereby incorporated by reference in its entirety.

TECHNICAL FIELD

This specification relates generally to electronic search tools, and more particularly to methods, apparatus and interfaces for enabling iterative search strategies.

BACKGROUND

Complex research is a multi-step, iterative process that includes broadening your knowledge of the domain, identifying new search paths, focusing the search, and selecting a few specific results. Typical search engines, like Google™, Bing® and Yahoo! °, are single session tools that do not support multi-session complex research. Accordingly, there is a need for a research tool that supports iterative searching for longer term, more complex research tasks.

SUMMARY

In accordance with one aspect of the present application, provided is a system for searching electronic records. The system includes a data storage device comprising a database and an iterative search tool, and a processor connected to the data storage device for executing the iterative search tool. The processor executes the iterative search tool to: communicate with a remote device via a network; render a web-based graphical user interface on the remote device; communicate with the remote device to receive a search query; save the received search query in the database; generate a listing of search results on the web-based graphical user interface on the remote device in response to the received search query; receive a user input via the web-based graphical user interface flagging, highlighting and/or annotating a selected one of the search results; and save the selected one of the search results and corresponding flag, highlight and/or annotation in association with the corresponding saved search query.

In accordance with another aspect of the present application, provided is a system that includes a data storage device comprising a database and an iterative search tool; and a processor connected to the data storage device for executing the iterative search tool. The processor executes the iterative search tool to: communicate with a remote device and a remote search engine via a network; render a web-based graphical user interface on the remote device; receive a search query from the remote device; save the received search query in the database; send the receive search query to the remote search engine; receive search results from the remote search engine in response to the sent search query; generate a listing of the search results received from the remote search engine on the web-based graphical user interface on the remote device in response to the received search query; receive a user input via the web-based graphical user interface flagging, highlighting and/or annotating a selected one of the search results; and save the selected one of the search results and corresponding flag, highlight and/or annotation in the database in association with the corresponding saved search query.

In accordance with another aspect of the present application, provided is a non-transitory, tangible computer-readable medium storing instructions adapted to be executed by a computer processor to perform a method for iterative searching. The method comprising the steps of: communicating with a remote device and a remote search engine via a network; rendering a web-based graphical user interface on the remote device; receiving a search query from the remote device; saving the received search query in a database; sending the receive search query to the remote search engine; receiving search results from the remote search engine in response to the sent search query; generating a listing of the search results received from the at least one remote search engine on the web-based graphical user interface on the remote device in response to the received search query; receiving a user input via the web-based graphical user interface flagging, highlighting and/or annotating a selected one of the search results; and saving the selected one of the search results and corresponding flag, highlight and/or annotation in the database in association with the corresponding saved search query.

In accordance with another aspect of the present application, provided is a system for searching electronic records that includes: a data storage device comprising a database and a search tool, and at least one processor connected to the data storage device for executing the search tool. The search tool is configured to: communicate with a first remote device via a network to receive a first search query having one or more search terms; save the received first search query in the database; communicate with the first or a second remote device to receive a second search query having one or more search terms; and save the received second search query in the database. The search tool is configured to: determine if the second search query is related to the first search query; and if the second search query is related to the first search query, combine the saved search queries into a single search object. The search tool may further be configured to: generate a listing of first search results in response to the received first search query; generate a listing of second search results in response to the received second search query; and the project tool may further be configured to associate the listings of the first and second search results with the corresponding saved first and second search queries in the single search object.

BRIEF DESCRIPTION OF THE DRAWINGS

The foregoing summary, as well as the following detailed description of exemplary embodiments, is better understood when read in conjunction with the appended drawings. For illustration purposes, exemplary embodiments are shown in the drawings, it being understood, however, that the present application is not limited to the specific embodiments disclosed. In the drawings.

DETAILED DESCRIPTION

Figure 1:
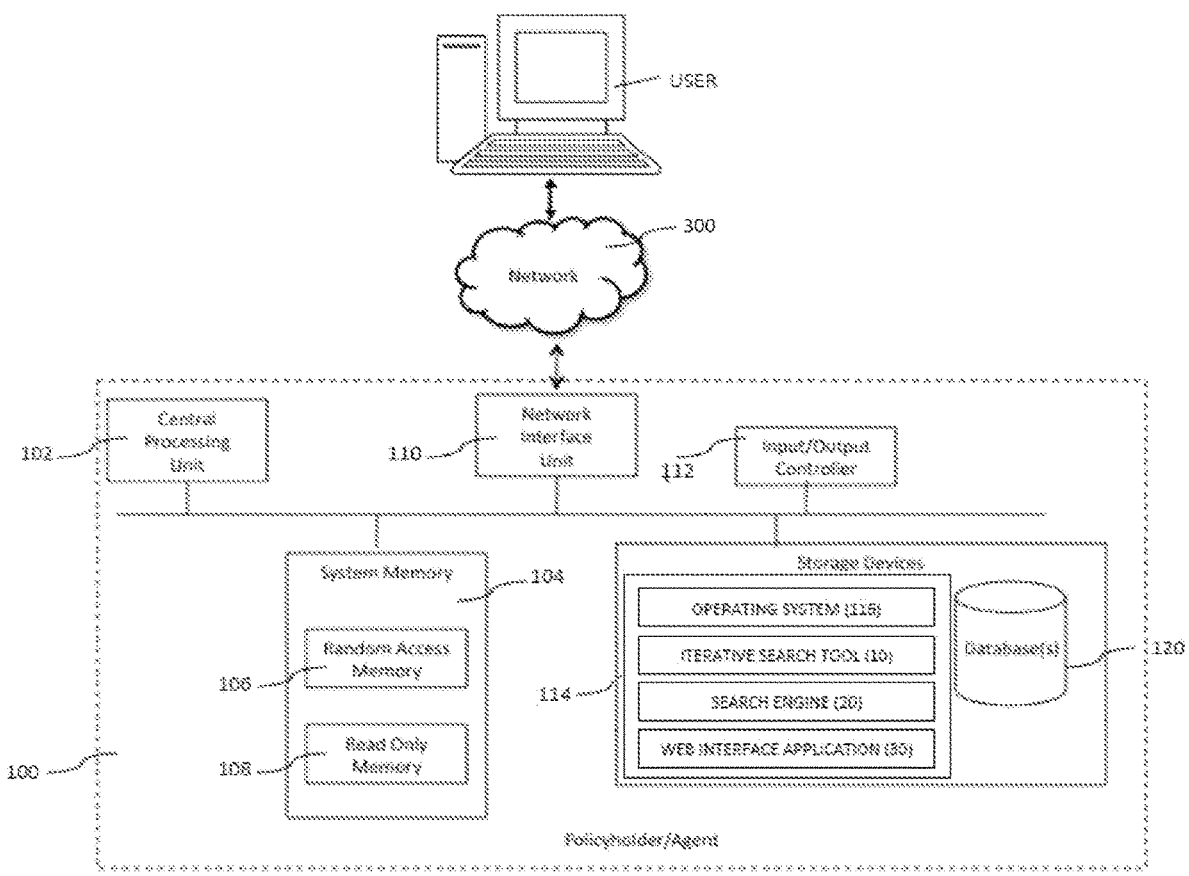
FIG. 1 shows an exemplary computer environment for implementing the iterative search tool of the present application.
Figure 2:
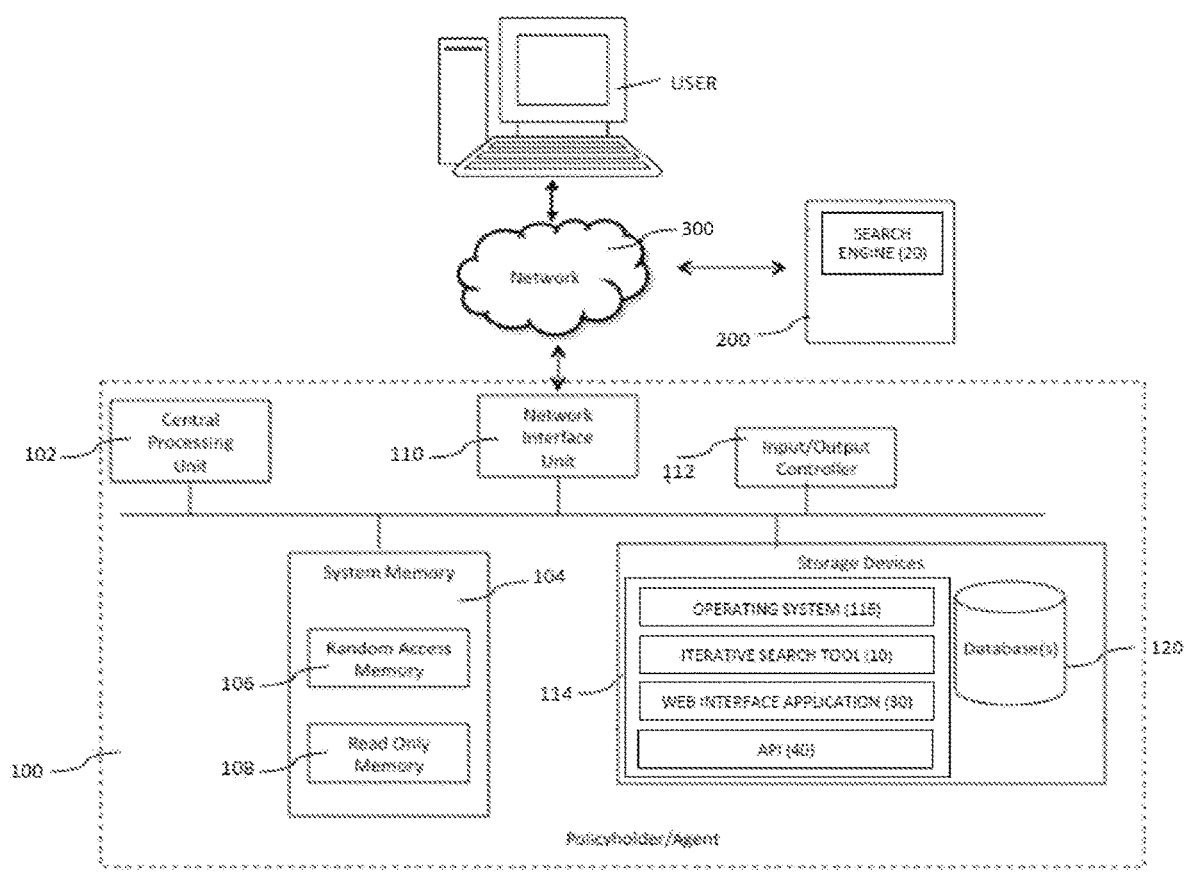
FIG. 2 shows another exemplary computer environment for implementing the iterative search tool of the present application.

Before the various embodiments are described in further detail, it is to be understood that the present application is not limited to the particular embodiments described. It will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. It is also to be understood that the terminology used is for the purpose of describing particular embodiments only, and is not intended to limit the scope of the claims of the present application.

In the drawings, like reference numerals refer to like features of the systems and methods of the present application. Accordingly, although certain descriptions may refer only to certain Figures and reference numerals, it should be understood that such descriptions might be equally applicable to like reference numerals in other Figures.

The present application is directed to an iterative search tool 10. Iterative search tool 10 provides certain functional features that support iterative searches on a search engine 20. Iterative search tool 10 may be integrated with search engine 20 or may interface with search engine 20.

Iterative search tool 10 is a computer program implemented on a computer system 100. FIG. 1 shows an exemplary computer system 100 for implementing iterative search tool 10. Computer system 100 comprises at least one central processing unit (CPU) 102, system memory 104, which includes at least one random access memory (RAM) 106 and at least one read-only memory (ROM) 108, at least one network interface unit 110, an input/output controller 112, and one or more data storage devices 114. All of these latter elements are in communication with the CPU 102 to facilitate the operation of the computer system 100.

Computer system 100 may be configured in many different ways. Computer system 100 may be a conventional standalone computer or alternatively, the function of computer system 100 may be distributed across multiple computing systems and architectures. In some embodiments, computer system 100 may be configured in a distributed architecture, wherein databases and processors are housed in separate units or locations. Some such units perform primary processing functions and are connected via a network interface unit to a communications hub or port that serves as a primary communication link with other units. A variety of communications protocols may be part of the system, including but not limited to: Ethernet, SAP®, SAS®, ATP, BLUETOOTH®, GSM and TCP/IP.

CPU 102 comprises a processor, such as one or more conventional microprocessors and one or more supplementary co-processors such as math co-processors. CPU 102 is in communication with the network interface unit 110 and input/output controller 112, through which CPU 102 communicates with other devices such as other servers, user terminals, or devices. CPU 102 is also in communication with data storage device 114. Data storage device 114 may comprise an appropriate combination of magnetic, optical and/or semiconductor memory, and may include, for example, RAM, ROM, flash drive, an optical disc such as a compact disc and/or a hard disk or drive. CPU 102 and data storage device 114 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, CPU 102 may be connected to data storage device 114 via the network interface unit 110.

Data storage device 114 may store, for example, (i) an operating system 116 for computer system 100; (ii) one or more applications (e.g., computer program code and/or a computer program product) adapted to direct CPU 102 in accordance with the present application; and/or (iii) database(s) 120 adapted to store information that may be utilized to store information required by the program.

Figure 3:
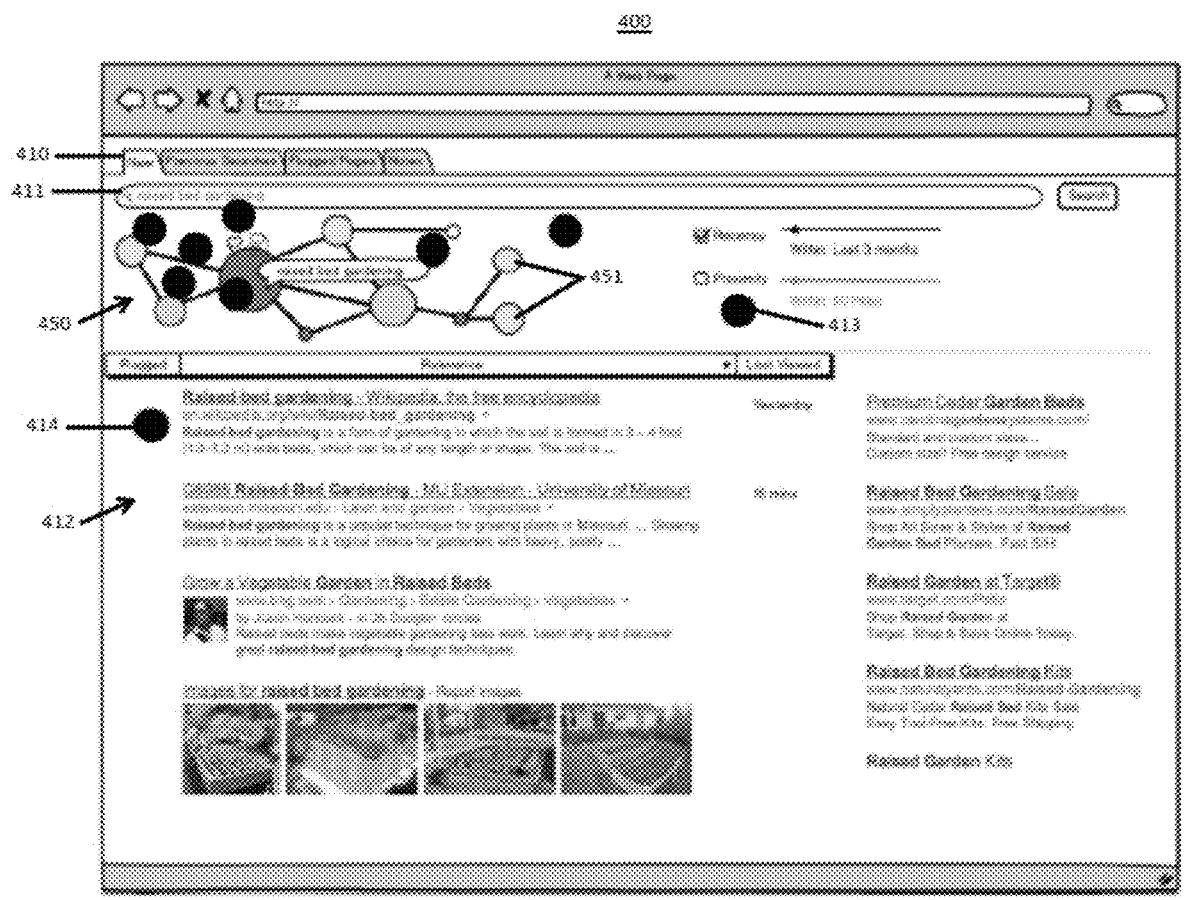
FIGS. 3-9 show various views of the web-based graphical user interface for the iterative search tool.

Various applications may be executed by computer system 100—including Iterative Search Tool 10, Search Engine 20 and Web Interface Application 30. While Iterative Search Tool 10 and Search Engine 20 are shown as separate programs, they may be integrated into a single program. Alternatively, as shown in FIG. 3, Search Engine 20 may be maintained on a remote third-party computer system 200, which is accessed by and connected to computer system 100 through a network 300. In such an embodiment where Search Engine 20 resides on a remote third-party computer system 200, Iterative Search Tool 10 accesses Search Engine 20 using an Application Program Interface 40 (API).

Web Interface Application 30 is adapted to generate a web-based graphical user interface 400 for communicating with remote user computing devices via a network. A remote user computing device may be any suitable device that is capable of communication with Iterative Search Tool 10 via the web-based graphical user interface 400, such as a Personal Computer (PC), a portable computing device such as a Personal Digital Assistant (PDA) or smart-phone type device, or any other appropriate storage and/or communication device. While Web Interface Application 30 may be implemented on computer system 100, Web Interface Application 30 may alternatively be implemented on a separate computer system in communication with computer system 100.

The operating system 116 and/or applications may be stored, for example, in a compressed, an uncompiled and/or an encrypted format, and may include computer program code. The instructions of the computer program code may be read into a main memory of the processor from a computer-readable medium other than the data storage device 114, such as from the ROM 106 or from the RAM 108. While execution of sequences of instructions in the program causes processor 102 to perform the process steps described herein, hard-wired circuitry may be used in place of, or in combination with, software instructions for implementation of the processes of the present application. Thus, embodiments of the present application are not limited to any specific combination of hardware and software.

Applications may also be implemented in programmable hardware devices such as field programmable gate arrays, programmable array logic, programmable logic devices or the like. Applications may also be implemented in software for execution by various types of computer processors. An application of executable code may, for instance, comprise one or more physical or logical blocks of computer instructions, which may, for instance, be organized as an object, procedure, process or function. Nevertheless, the executables of an identified application need not be physically located together, but may comprise separate instructions stored in different locations which, when joined logically together, comprise the application and achieve the stated purpose for the application such as implementing the business rules logic prescribed by computer system 100. An application of executable code may be a compilation of many instructions, and may even be distributed over several different code partitions or segments, among different programs, and across several devices.

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 102 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Database(s) 120 may store user account information and electronic records that are identified and selected via Iterative Search Tool 10 and Search Engine 20. Database(s) 120 may include a database management system (DBMS) software of a relational database type, such as a DB2 UNIVERSAL DATABASE™ provided by International Business Machines Corporation, an Access™ product provided by Microsoft Corporation or an Oracle® Database product provided by Oracle Corporation for storing and processing information. In some embodiments, database(s) 120 may also provide certain database query functions such as generation of structured query language (SQL) in real time to access and manipulate the data.

Note that any devices described herein may communicate via one or more communication networks, which may be one or a combination of a Local Area Network (LAN), a Metropolitan Area Network (MAN), a Wide Area Network (WAN), a proprietary network, a Public Switched Telephone Network (PSTN), a Wireless Application Protocol (WAP) network, a BLUETOOTH® network, a wireless LAN network, and/or an Internet Protocol (IP) network such as the Internet, an intranet, or an extranet.

Iterative Search Tool 10 is executed by CPU 102 of computer system 100 to provide a web-based graphical user interface 400 with features that support iterative searches on Search Engine 20. The various features of Iterative Search Tool 10 will be described with reference to the various views of the web-based graphical user interface 400 shown in FIGS. 3-9. In the embodiment shown in FIGS. 3-9, Iterative Search Tool 10 provides a web-based graphical user interface 400 with a set of features that supplement a third-party Search Engine 20 in a browser. In other words, in the embodiment shown in FIGS. 3-9, Iterative Search Tool 10 provides a user interface shell that adds a layer of functionality to search results generated by a third-party browser-based Search Engine 20. Iterative Search Tool 10 may connect to Search Engine 20 via a customized API 40. However, it should be noted that Iterative Search Tool 10 may alternatively be fully integrated with Search Engine 20.

Iterative Search Tool 10 may be implemented as a SaaS search tool that requires login and identity verification. Login procedure with specific User ID. Search query history saved and associated with the specific User ID. Computer system 100 can grant a user access to Iterative Search Tool 10 upon authentication of the user through a login process via user interface 400 using a previously established customer ID and password. Once the computer system 100 authenticates the user's ID and password, the user is granted access to Iterative Search Tool 10.

Figure 4:
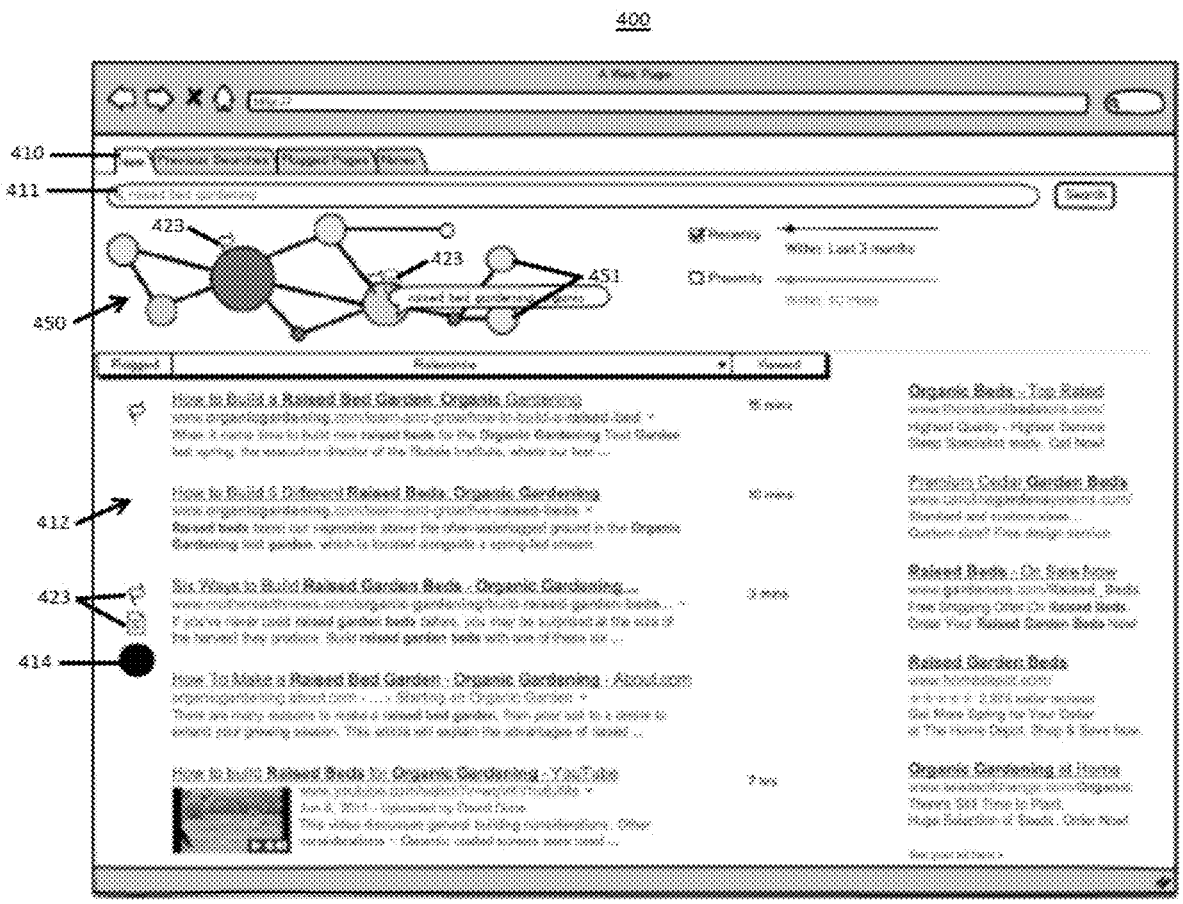

Web-based graphical user interface 400 provides various tabs/pages for accessing various features provided by Iterative Search Tool 10. For example, web-based graphical user interface 400 provides a tab 410 for conducting new searches, a tab 420 for accessing saved previous searches, a tab 430 for accessing saved flagged pages and a tab 440 for accessing saved notes. As shown in FIGS. 3 and 4, tab 410 of user interface 400 for conducting new searches includes one or more search fields 411 for entering a search query. Every search query entered by a user is saved and associated with the User ID. Accordingly, all of the search queries associated with a User ID can later be viewed and accessed.

Figure 10:
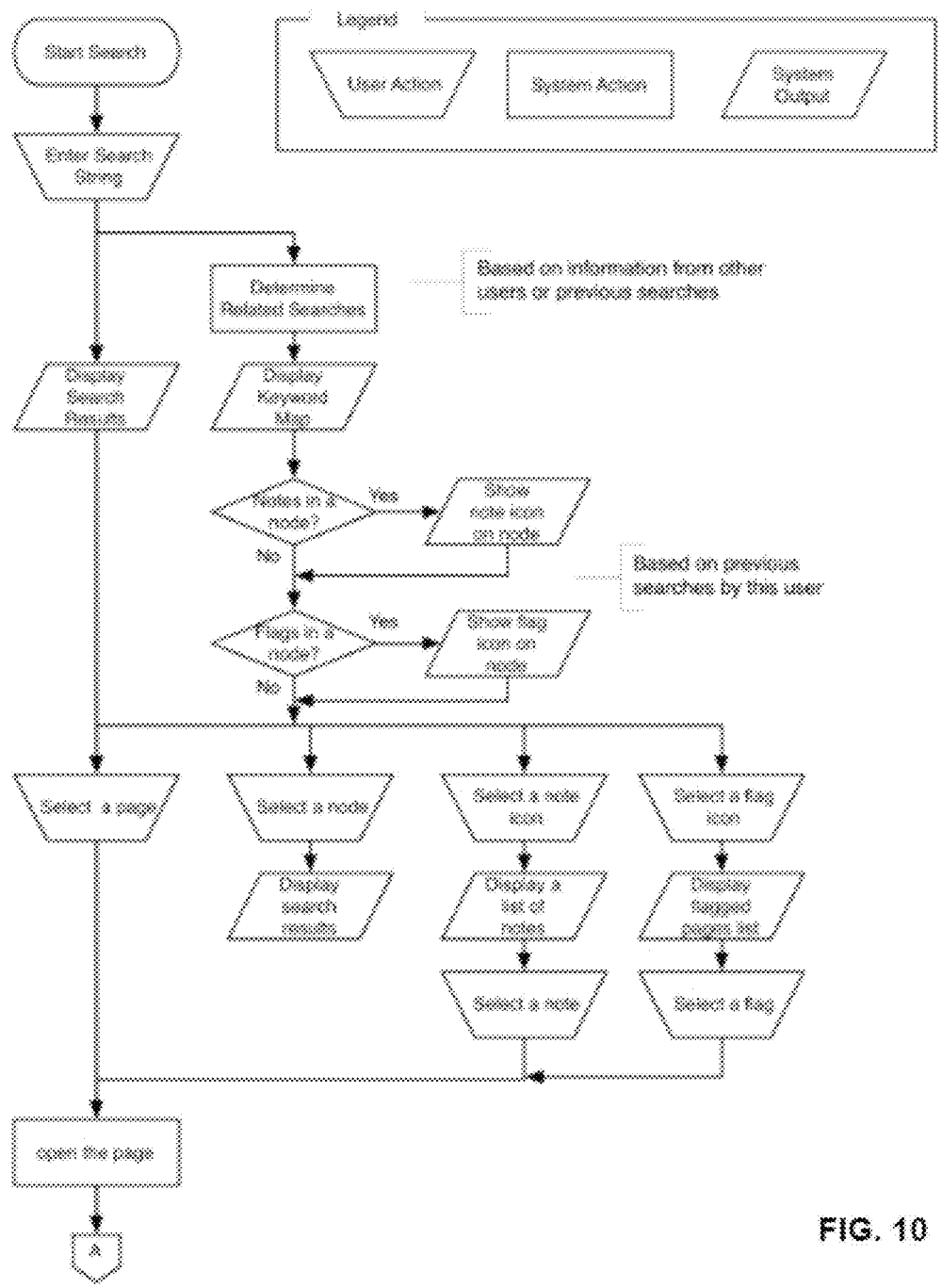
FIG. 10 shows a flowchart for executing a new search.

Tab 410 of user interface 400 also includes a search results list 412 for displaying the search results generated by Search Engine 20 in response to the search query entered in search field 411. Tab 410 of user interface 400 further includes one or more search controls 413 for filtering the search results generated by Search Engine 20 in response to the search query entered in search field 411 and displayed in search results list 412. Additionally, Iterative Search Tool 10 may allow users to generate customizable search templates that have pre-defined search fields and/or filters. FIG. 10 shows a flowchart depicting the operation of Iterative Search Tool 10 to perform a new search via tab 410 of user interface 400.

Figure 8:
Figure 9:
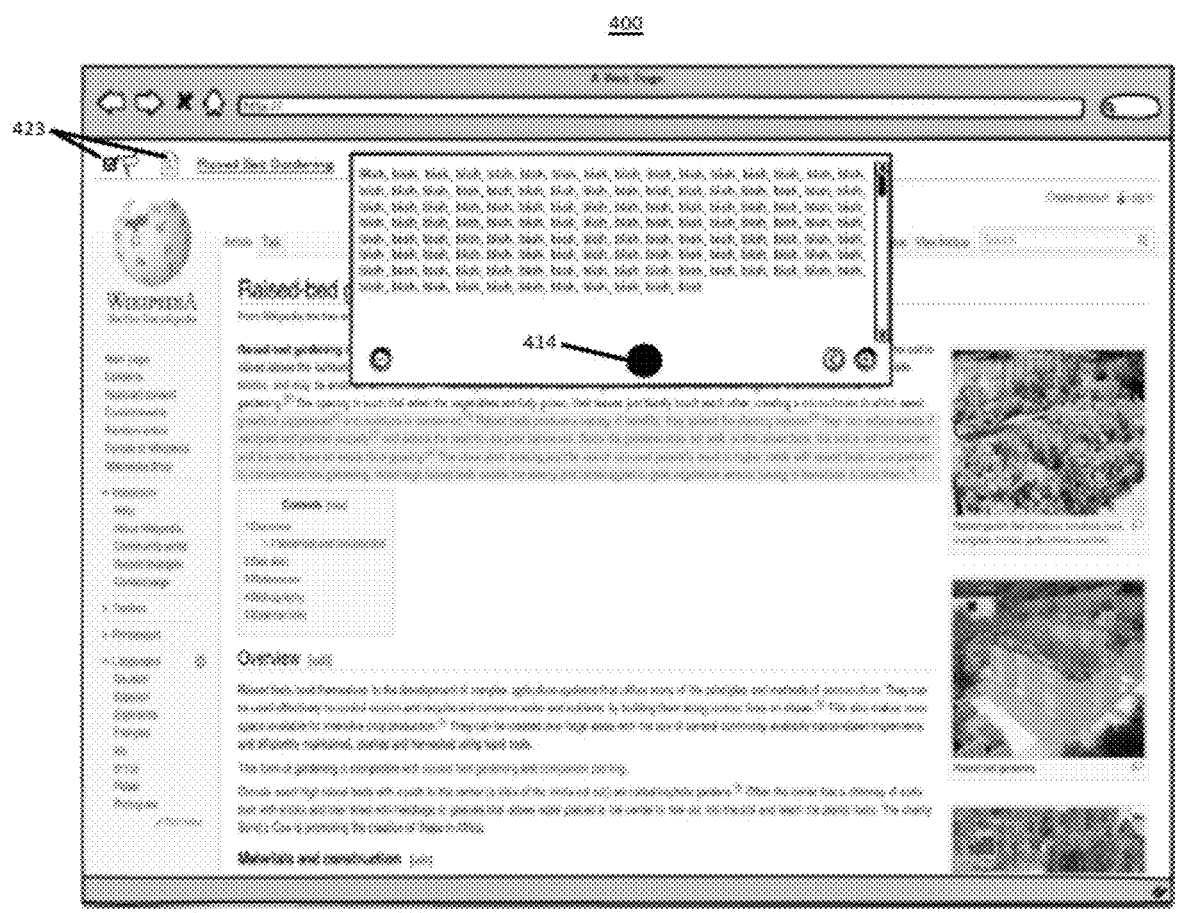
Figure 12:
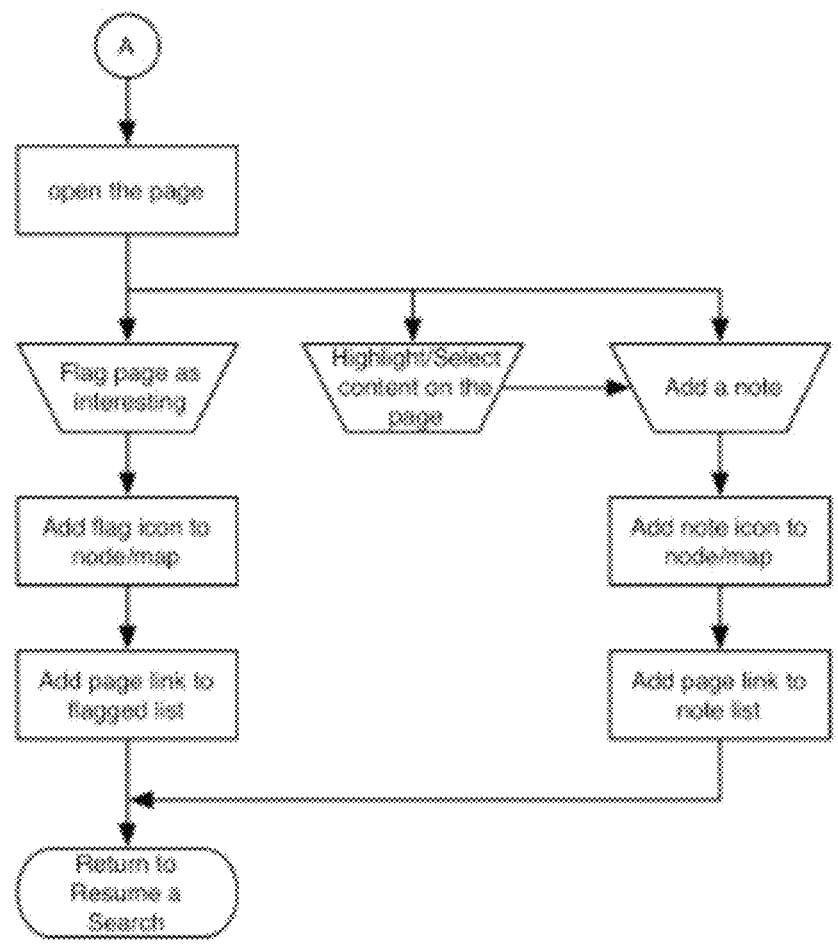
FIG. 12 shows a flowchart for interacting with a selected search result.

Search results list 412 is a listing of links to search results that are responsive to a search query. The links can be selected to view the corresponding responsive search result. For example, FIG. 8 shows a search result selected from search results list 412. Further, FIG. 12 shows a flowchart depicting the operation of Iterative Search Tool 10 to display a selected search result via user interface 400. User interface 400 provides input controls 414 that a user can use to identify a search result as relevant to a search query (e.g., flag), to highlight certain sections of a search result (e.g., highlighting tool) and to annotate certain sections of a search result (e.g., sticky note). When a user flags, highlights and/or annotates a search result, the link to the flagged, highlighted and/or annotated search result is saved and associated with the corresponding User ID and executed search query in database 120 of computer system 100. For example, FIGS. 8 and 9 show a search result selected from search results list 412, which has been flagged, highlighted and annotated.

Tab 410 of user interface 400 additionally includes a visual map 450 illustrating the entered search query as well as other suggested search queries related to the entered search query. The entered search query and the suggested search queries may be illustrated as a series of nodes 451 connected with lines 452 that depict the relationship between the entered search query and the suggested search queries. Visual indicators (e.g., size and color of nodes) can be used to indicate characteristics, such as quality and quantity of the search results, for the search query associated with each node. The connecting lines are used to represent a state of the search, such as relationship to previously performed searches, relationship to flagged, highlighted or annotated results, etc.

If a user selects a node 451 for a suggested search query in the visual map 450, interface 400 displays the search query corresponding to that node and Search Engine 20 executes the corresponding search query and interface 400 displays a search results list 412 for the executed search query. User interface 400 provides input controls 414 that a user can use to identify a search result as relevant to a search query (e.g., flag), to highlight certain sections of a search result (e.g., highlighting tool) and to annotate certain sections of a search result (e.g., sticky note). When a user flags, highlights and/or annotates a search result, the flagged, highlighted and/or annotated search result is saved and associated with the corresponding User ID and executed search query in database 120 of computer system 100.

Visual map 450 includes visual indicators 423 (e.g., icons) to indicate whether a user has previously flagged a search result associated with a node, has highlighted a search result associated with a node 451, or has annotated a search result associated with a node 451. The same visual indicators 423 can also be used in search results list 412 to indicate whether certain search results have been fagged, highlighted and/or annotated. Visual indicators 423 can also be used to indicate the number of annotations associated with a search result.

A Neural Network learning engine generates the suggested search queries. The Neural Network learning engine suggests contextually appropriate search queries to pursue, which are displayed in the visual map 450 as nodes 451. The Neural Network learning engine also automatically adjusts its search query suggestions based on search results that are selected, flagged, highlighted and/or annotated. Further, the Neural Network learning engine learns from each user's search behavior and transfers this knowledge to other users' searches. Accordingly, the Neural Network learning engine becomes more powerful with each use and can develop an aggregated knowledge repository for a specified group of users. The Neural Network learning engine learns from a specific user group's previous searches and can tailor its suggested search queries and or search results list based on aggregate user behaviors within the specified user group. Thus, different knowledge bases can be developed for different user groups (e.g., different companies). Therefore, the Iterative Search Tool 10 creates an institutional memory of previous users' searches that later helps other users. This Iterative Search Tool 10 is therefore optimized specifically for a user group's domain.

Figure 5:
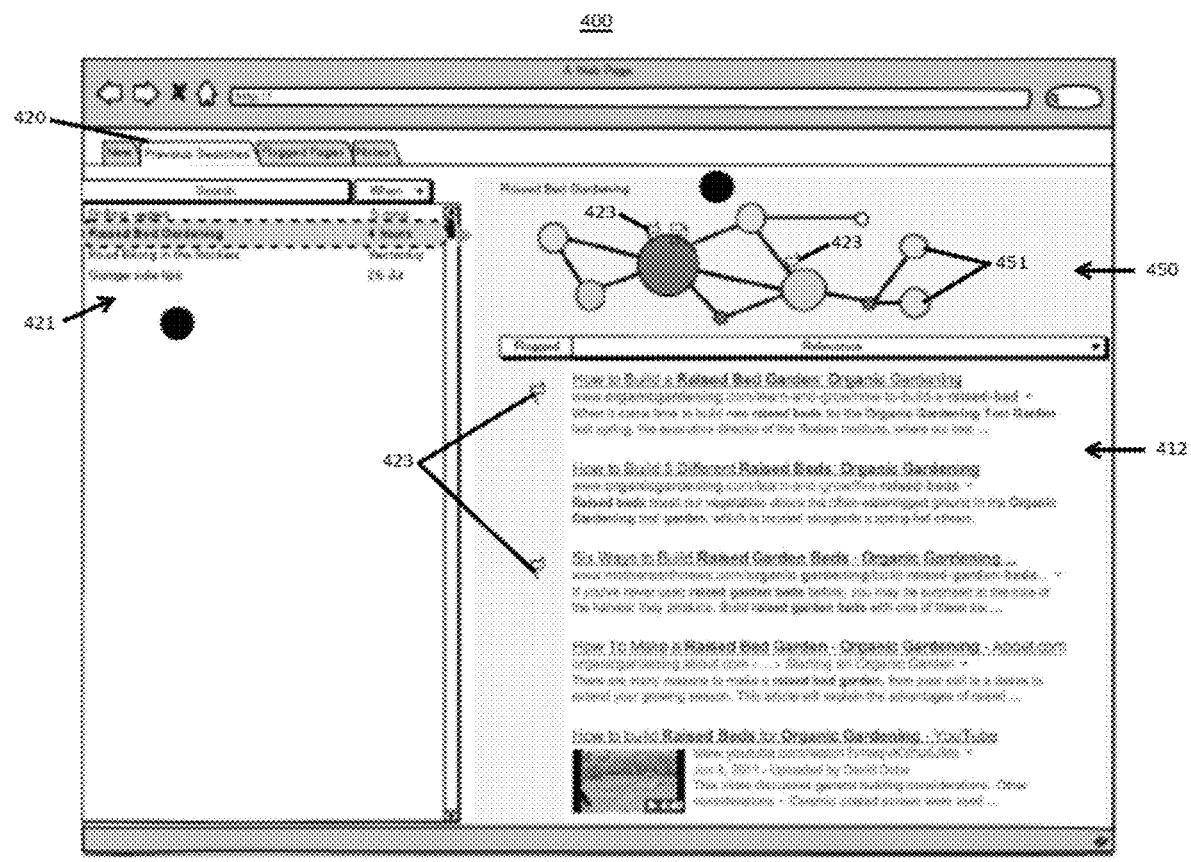
Figure 11:
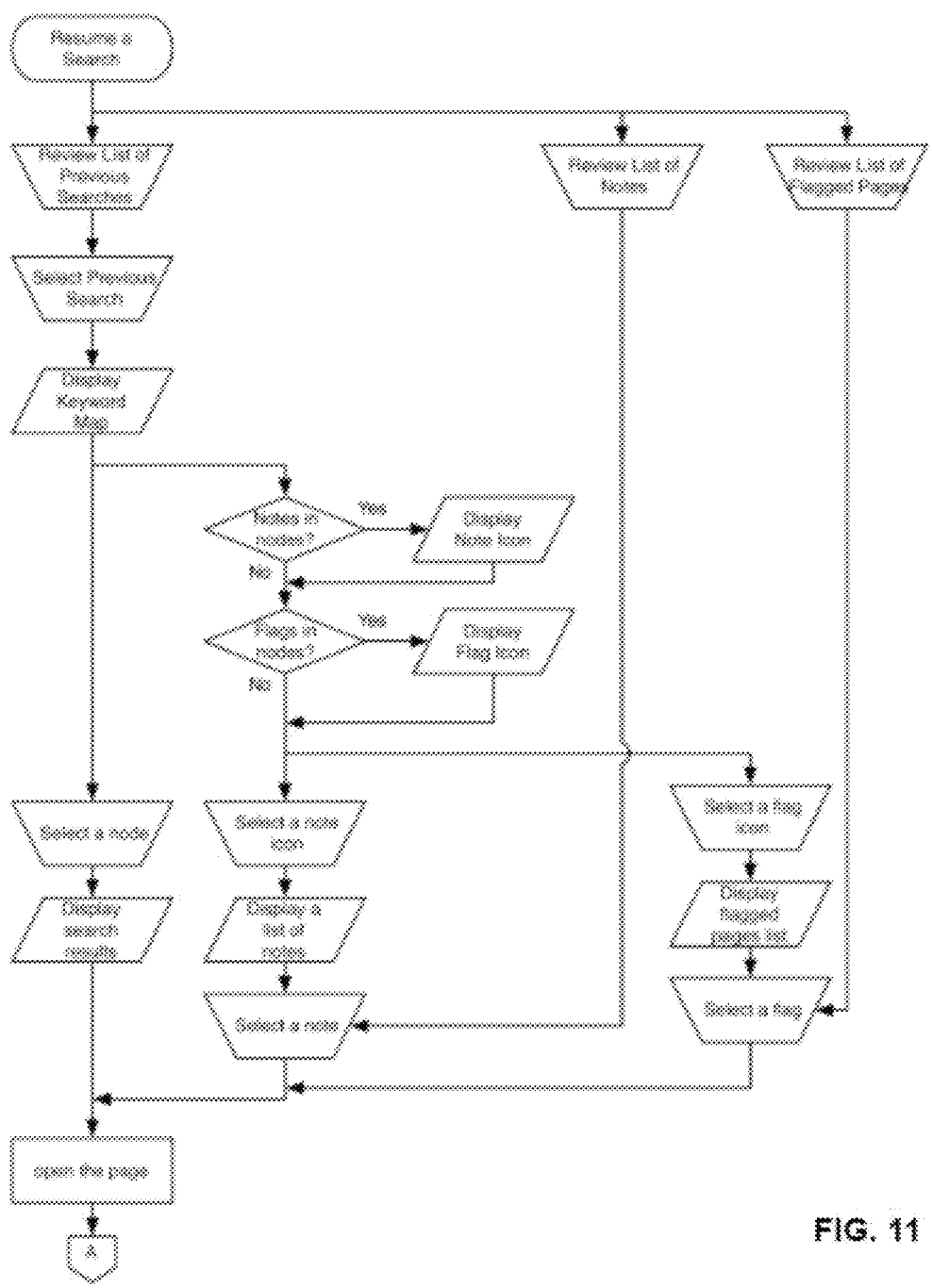
FIG. 11 shows a flowchart for resuming a previous search.

As shown in FIG. 5, tab 420 of user interface 400 for accessing previous searches includes a listing 421 of search queries that were previously executed, saved and associated with a User ID. FIG. 11 shows a flowchart depicting the operation of Iterative Search Tool 10 to resume a previous search via tab 420 of user interface 400. If a user selects a search query from the listing 421 of saved search queries, a visual map 450 and a search results list 412 corresponding to the selected saved search query is displayed on interface 400. Visual map 450 includes visual indicators 423 (e.g., icons) to indicate whether a user has previously flagged a search result associated with a node, has highlighted a search result associated with a node 451, or has annotated a search result associated with a node 451. Also, the same visual indicators 423 can be used in search results list 412 to indicate whether certain search results have been fagged, highlighted and/or annotated. Visual indicators 423 can also be used to indicate the number of annotations associated with a search result.

Figure 6:
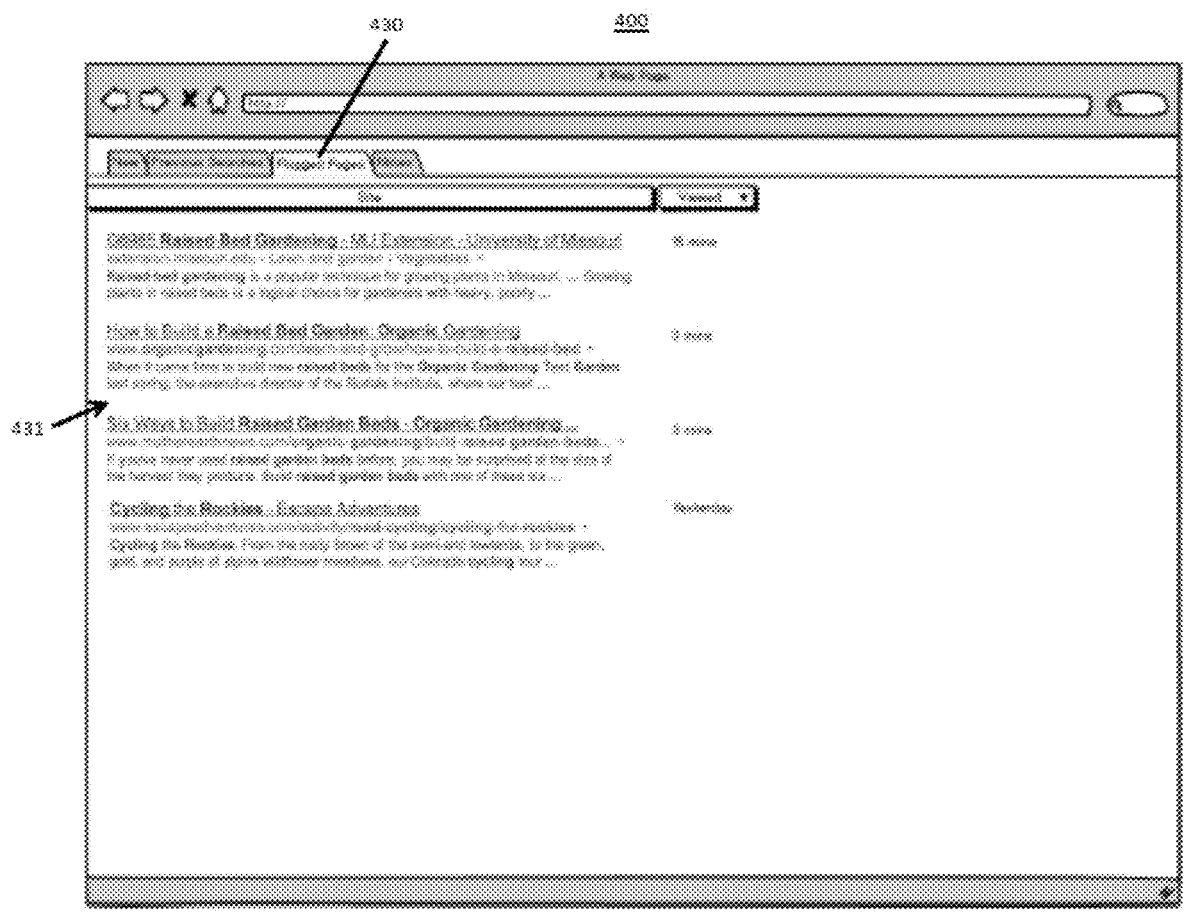

As shown in FIG. 6, tab 430 of user interface 400 for accessing saved flagged pages includes a listing 431 of search results that were previously flagged and associated with a User ID. If a user selects a flagged search result from listing 431, the search result is displayed on interface 400 as shown in FIG. 8, including any previously saved highlighted sections of the search result.

Figure 7:
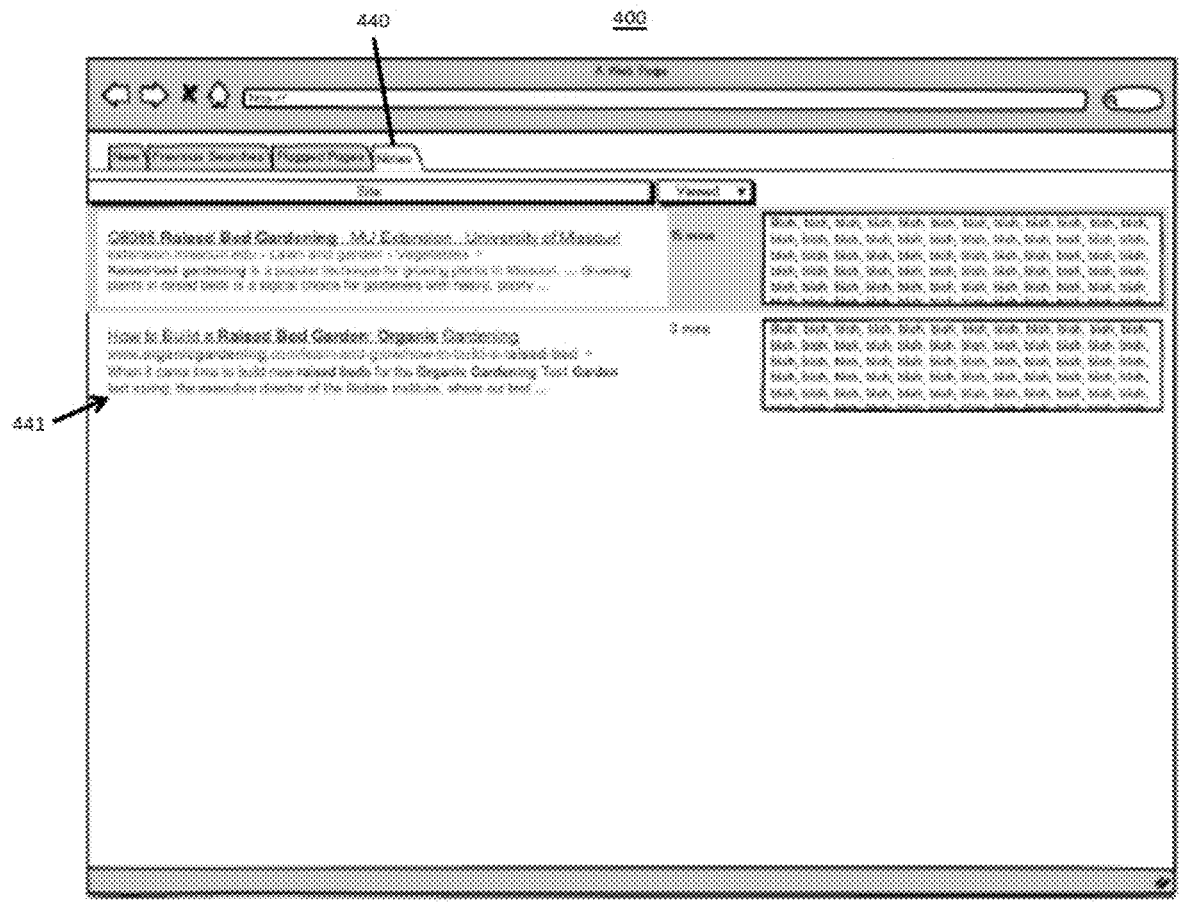

As shown in FIG. 7, tab 440 of user interface 400 for accessing saved notes includes a listing 441 of notes that were previously created and associated with a search result and User ID. If a user selects a note from listing 441, the search result and note are displayed on interface 400 as shown in FIG. 9.

Figure 13:
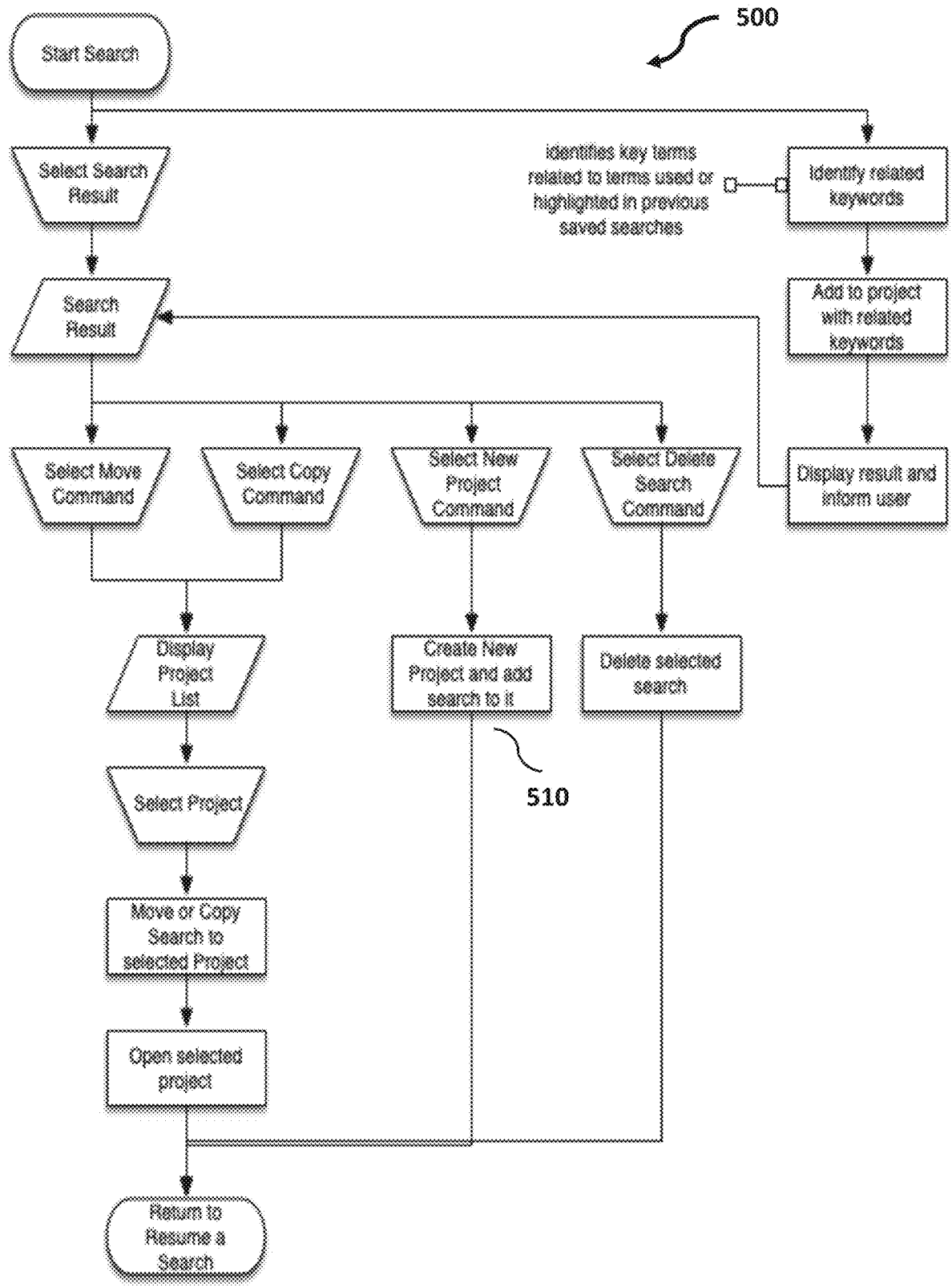
FIG. 13 shows a flowchart for implementing a project tool.

In accordance with another aspect of the present application, a comprehensive search tool may include some of all of the features of the above disclosed iterative search tool 10 and may additionally include or be functionally coupled to a project tool 500. The primary function of the project tool 500 is to allow one or more searchers to manage multiple search queries. Another function of the project tool is to allow a plurality of searchers (i.e., a search community) to have access to and collaborate on multiple search queries and their results. The project tool groups multiple search queries into a single search project. An example embodiment of a project tool 500 is shown in FIG. 13.

For example, a searcher may initially perform a search for cars. The search query (and optionally the results) may be saved in a search project called "New Vehicle." The same searcher may then search for trucks, but may want this search to be part of the same "New Vehicle" search project and not a disparate search. As another example, search queries (and results) for homes in CT and then in VA may be grouped into a single search project called "Homes." Thus, it can be seen that four different search queries may be performed, but they are grouped into two very different projects. A user interface would show two search projects ("New Vehicle" and "Home") with two search queries saved within each project.

The project tool 500 saves related search queries and also may allow for the sharing of some or all of the saved search queries among a plurality of searchers (or a subset of the plurality of searchers). Further, the project tool 500 may save the associated search results of the related search queries and allow for the sharing of some or all of the associated saved search results among the searchers. The search results may include a visual map, as disclosed above with respect to the iterative search tool. Further, the project tool 500 may save and share the reactions (e.g., flagging, highlighting, annotating, etc.) of the search community to the saved search queries and/or search results. These tasks are used to manage, sort, filter and categorize results so that they are easily accessible and can be used in communicating among the searchers the online research that was conducted.

The project tool 500 is configured to evaluate new search queries for relatedness to previously saved search queries. The project tool 500 identifies additional searches that sufficiently relate to a previously saved search and combines or associates these searches into a single search project or search object 510. As used herein, the term "combine" means to link, join or relate, but not to merge or intermix. As such, the searches retain their separate identities. Thus, according to one embodiment, a search query that is performed and stored in a database may have an associated data field that identifies a specific search project or search object. This field may or may not be filled in. If the search project data field is filled in, then that search query is related to other queries with the same search project data field identifier. That field could be filled in by a user (for example, using a dialog tool) or it could be automatically filled in using a computer algorithm. Thus, the project tool 500 creates a collection of related search queries that are contained in one search project or search object 510 and are thereafter available for sharing among a plurality of searchers.

When a new search query is entered, the project tool 500 may determine whether the new query is related to an existing saved search or an existing search project. Relatedness may be based on the semantic relationship of the new search terms to the existing search terms. For example, the project tool may determine that one or more search terms having "commonality" are used in a plurality of searches. According to certain embodiments, search terms may be considered to be "common search terms" based on their roots, entymology, and/or synonyms. Thus, for example, the search term "car" may be considered to have commonality with the search term "auto." Similarly, commonality may be found between the search terms "car," "auto," "automobile," and "vehicle." According to certain embodiments, the project tool may allow a user to set the criteria to be used by the algorithm to determine if search terms are "common search terms" (i.e., search terms having commonality). For example, a user may want to exclude the use of synonyms as a commonality criteria. Optionally, the project tool may include a default criteria to be used by the algorithm to determine if search terms are common search terms.

If the project tool determines that one or more common search terms are used by two or more search queries, the project tool may determine that the search queries are related. According to certain embodiments, the project tool may allow a user to set the criteria to be used by the algorithm to determine if the identified common search terms are sufficient for determining that the search queries are related. For example, a minimum number of search terms may need to be common search terms before two search queries are determined to be related. According to other embodiments, criteria other than (or in addition to) the identification of common search terms may be used to determine relatedness. As a non-limiting example, if the searches are performed close in time and/or by the same user, the minimum number of common search terms necessary for a determination of relatedness may be less than if the searches are performed after a large lapse in time or by different users. Thus, the project tool may allow a user to set a maximum time lapse criteria or a user criteria to be used by the algorithm to determine if a new search query should be combined into a single search project. According to certain embodiments, sliding factors and/or weighting factors may be included in the algorithm to determine if a new search query should be combined into a single search project. For example, the more a search term (or common search term) is used (over the course of multiple searches), the more important it may become to determining the relatedness of future search queries. According to other embodiments, an authorized searcher (e.g., the "owner" of the search project) may be allowed to identify search terms that cause a particular search to be included (or excluded). As non-limiting examples, a pairing of search terms may become determinative (e.g., injury+skull), or a pairing of a search term with a particular searcher (e.g., cranium+ Searcher Smith).

According to a preferred embodiment, the project tool may learn from a users' individual behavior using the search tool (flagging, highlighting, annotating, etc.) to establish relevance of different search terms and to combine the different search terms into a single search object or project. For example, the project tool may recognize that a user has started a search on "Trucks," but that user had also previously highlighted search result content containing "Trucks" while researching "Cars." Another example of the project tool establishing relatedness may occur when the user clicks on a search node of "Cars and Trucks" while researching "Cars." These user behaviors indicating the inclusion of "Trucks" while researching "Cars" may be used to determine relatedness or relevance of the two searches.

Alternatively and/or additionally, relatedness of search queries may be based on a correspondence between the new search results and the saved search results. As one non-limiting example, search results have a common URL (or a common parent URL) may lead to a determination that search queries are related. According to certain embodiments, relatedness may be based on a correspondence between the users' reactions (e.g., flagging, highlighting, annotating, etc.) to the new search queries and/or search results and the saved search queries and/or search results. As noted above, the project tool may allow a user (particularly, an authorized user) to set the criteria or metrics to be used by the algorithm to determine whether search queries are related. The project tool may also include default criteria to be used by the algorithm to determine if search queries are related. Optionally, a user could indicate that a search query is related to a new or different search or search project.

The project tool 500 may be configured to create and save an object 510 that contains a collection and/or a directory of related search queries. The object 510 may be a file, folder, a collection of linked folders, etc. According to one embodiment, the object 510 for a specific selected search project may be provided with a proprietary extension or path. The object 510 may contain (or link to) all of the search queries identified as being related.

The project tool 500 may be configured to share the search files associated with the search project or search object 510 with other authorized searchers or users. For example, other users may access the search object, open one or more saved search queries associated with the object 510, access search results and generally interact with the search project. As another embodiment, a user may be able to assign a unique search path to a search project. This could allow viewing in the shared search project of outside searches queries and/or search results, including some or all flags, maps, notes, highlights, but may retain the original search queries, results, etc. as independent files or objects. According to another embodiment, the project tool may allow two or more independently assembled search projects to be combined into a larger single search project or search object. As a non-limiting example, a single search project containing research on "cars" may include a plurality of search queries and associated search results, many flagged and/or highlighted pages, suggested follow on queries, and notes (collectively, the entirety of the research experience). A similar research experience might have been assembled in a single search project for "trucks." Subsequently, a user may decide that these two projects, "cars" and "trucks," should be assembled into a single project. This flexibility would result in powerful tool for collecting and preserving the entirety of the research experience.

In preferred embodiments, as noted above, the search object 510 may contain (or link to): the search queries identified as being related; all or some of the search results produced by the identified search queries; the reactions (e.g., flagging, highlighting, annotating, notes, etc.) of the searchers to the search queries and/or search results; search history maps; and/or suggested search queries generated by the iterative search tool. The entire contents of the search project may be selected and shared as a single object 510 with individual searchers. Optionally, for example, certain searchers may only be provided access or sharing to just a portion of the search project/object. As another example, certain searchers may be provided access to the search project/object, but would not necessarily be granted authorization to contribute to the search project. Optionally, searchers' contributions may be logged and/or coded as part of the history of the search project. As even another example, optionally, only certain elements, such as flagged pages, history map, annotations, suggested search queries, etc. contained within a project may be selected and shared with individual searchers. Some or all of these selected elements may be associated with a sub-object having a specified path within the overall search object. Further, each element of the users' interface with the search results (e.g., flagging, notes, highlighting, etc.) may be independently selected to be shared with one or more users.

A preferred feature of the project tool 500 would allow all the information associated with a search project to be shared in real time with other users in a collaborative way. According to this feature, multiple users may access and update a single search project at the same time. This ability to share may include all queries, results, flags, maps, notes, highlights. Optionally, a search project owner may assign collaborators as viewers, active participants or administrators for various aspects of the search project, thereby allowing for additional control. Versions, whether saved as a new search project or whether saved as a time-stamped version under the same search project umbrella, would allow a user to maintain a temporal record of the focus of their research, or when research was handed off to another user, or when the user began a new collaboration.

According to yet another embodiment, the project tool 500 could identify searches that were evaluated but not identified as being sufficiently related to the saved searches and/or saved search project. Thus, it is recognized that different, non-related, searches or search projects may include at least some of the same (and/or similar) search terms without automatically being included into a single search project. Optionally, a search project may be curated by either an authorized user or group of users or the by the project tool. For example, searches older than a predetermined lapsed time may be automatically deleted from the search project or, alternatively, automatically placed in an archived subproject.

According to another embodiment, the search tool may add appropriate citations to each flag and highlight these citations as an additional data field to be stored with the search metadata. For example, when a "citation selection" feature is enabled, a user may be prompted to verify, edit, amend, etc. the citation data. Such amended data may include additional information to be stored with the metadata. As one option, the user will be able to turn on and off the citation feature. This feature may be provided as part of the iterative search tool, the project tool, or as a standalone feature.

Another feature provided as part of the search tool may include automatically adding specific project information upon project creation. Information such as location (e.g., IP address), time and language (from browser) as well as a user's browser and device identifiers may be stored within the search project, without user intervention. Optionally, this information may be protected such that it is not editable or viewable by the user.

According to certain embodiments, the search tool may also include an archiving tool. The archiving tool could save the search project, including search terms, results, notes, flagged items, and search history maps. This archived search project may be saved in a list of other archived search projects. An archived project may be unarchived and reused at any time in the future.

Caching prior search results may allow more specific result sets to be returned. These search results could be augmented by calls to the target search engine (or engines) for additional search results. The value of this will depend on the number of similar queries made by multiple users and the size of the result cache. In a preferred embodiment, the cache algorithm may be designed to grade or weight popular queries higher than the majority of other queries. As non-limiting examples, this popularity weighting may be driven by manual user "likes" or by determining if users who receive the cached results remove them from their search result set.

As noted above, the search tool may allow a user to specify and/or identify certain criteria that the computer algorithm uses to make determinations involved in the ultimate determination of the relatedness of the search queries collected for a specific search project. The search tool may additionally (or alternatively) allow a user to provide input regarding access to and maintenance of a specific search project. According to certain embodiments, the search tool may include a dialog tool for receiving user input. Dialog tools may be provided to help the user make decisions. For example, the project tool will have an associated dialog took that may guide a user in combining search queries into search projects.

The dialog tool may be displayed on the remote device accessible to the user. According to certain embodiments, the dialog tool may be provided as a series of menus or as a set of hierarchical questions or requests for information. According to one embodiment, a user may access, for example, a "create search query" menu, and in response to the dialog tool's requests for information, may input criteria used to formulate and/or limit a search query (e.g., specific search terms, date limits, search engines, excluded search terms, prioritized search terms, etc.). According to a further embodiment, a user may access, for example, a "comment on search result" menu, and in response to the dialog tool's requests for information, a user may flag, highlight, annotate, and/or request a citation for, etc. a specific search result. According to another embodiment, a user may access, for example, a "relatedness criteria" menu, and in response to the dialog tool's requests for information, a user may specify the criteria to be used in the determination of whether a second search query is related to a first search query. As a non-limiting example, this "relatedness criteria" menu may include a sub-menu or set of hierarchical questions for inputting "semantic relatedness rules" or "search term weighting rules" or other menus allowing for a user to set the parameters of the algorithm determining the relatedness of the search queries. The dialog tool may include additional menus (or hierarchical questions) including as non-limiting examples, a menu for providing (or excluding) user access to all or part of a search projects collected information, a menu for inputting archiving or curating control criteria, a menu for selecting search type (e.g., cascading or general) and for providing other search filters, etc. For example, the menu for collecting relevant search filter facets (knowledge domains), could include required terms, time/date limits, and geographic limits (city, state, country). These filters may be used for modifying the underlying search query terms and/or to filter or limit the responses shown. Any of these menu settings could be saved within the search project and may be edited by the user.

According to certain embodiments, the search tool may include search templates. Search templates provide an enhanced ability to save a template search, similar to saving a word document template. For example, there may be certain filter and sort settings and domain settings that could be configured to give the user a reasonably limited set of results due to the filter and sort settings defined by another user in their template. Categories for filters may include, but are not limited to: geographic location, date stamp on content, key words, required words, specific industries, specific domains, and/or companies. For example, for a template titled "Big Three US Trucks," relevant filter categories may include: Companies (example user input=GM, Ford, Chrysler), Key Word (example user input=Trucks), Time Frame (example user input=2015-present), and Geolocation (example user input=New York).

According to certain embodiments, the search tool may include a cascading search tool. In general, a search based on a search term involves the system (or search engine) looking for that key word. Most search engines implement algorithms wherein the search term is used to determine the most popular results that everyone who has every searched for that same search term determines was important (ranking). A second or subsequent search using the same search term and an additional search term, returns search results for both of the search terms independently, but then also provides the most common results when the search terms are used together.

In contrast, a cascading search involves using the first and second search terms sequentially, i.e., the first search term provides a first set of search results, and the second search term is then used to search within those first set of search results. In other words, the second search term is not used to search the entire web for the terms independently. If the searches were conducted in a different order, very different search results would be obtained. With a cascading search the second search query acts on the results from the first search query, such that the second search results are limited to a subset of the first search results.

The Iterative Search Tool 10 described above provides a number of advantages. Simple search engines fail to recognize that research is a cognitive process that may require expanding a user's understanding of the domain before narrowing the search focus. The Iterative Search Tool 10 can broaden a user's perspective with suggested search queries before allowing a user to focus on particularly relevant search results.

Also, the Iterative Search Tool 10 also provides better management of information gathered using search engines. Conventional search engines treat each search as a new, independent, and unique search. Further, conventional Internet browsers provide only rudimentary tools for supporting searches, such as browser history and bookmarks. Thus, the tools in conventional search engines and Internet browsers do not provide support for iterative searches. The Iterative Search Tool 10 obviates the need for bookmarking search results by saving search query history and providing tools for highlighting and annotating search results. The Iterative Search Tool 10 allows a user to revisit a previous search with the necessary context to continue to pursue the search over multiple sessions. Further, the Iterative Search Tool 10 allows a user to share a search so that it does not have to be restarted anew if more than one user is investigating the search.

Further, the Iterative Search Tool 10 can be used to supplement a third-party search engine in a browser to improve search experience by supporting iterative search behavior. Thus, the Iterative Search Tool 10 provides added functionality without requiring users to change their search engines or database preferences. Further, the Iterative Search Tool 10 can be used to search a dedicated complex database, such as a legal or technical database.

The project tool 500 described above provides a number of advantages. It allows the creation of a search project whereby iterative searches may be shared among a community of searches. Thus, it expands upon the functionality of the iterative search tool 10. Search queries, search results, users' reaction to the search results and metadata related to the searches may be collected and stored in a single, proprietary search project. This search object may be accessed and expanded in real-time by searchers in the community, thus facilitating the flow of information among the users and providing a historical record of the research experience. The project tool 500 may automatically evaluate a new search query for relatedness to existing search queries in a search project, and, if determined to be sufficiently related, may combine the new search query into the search project.

The disclosed search tool advantageously may streamline a user's ability to use information collected in a coherent database from searches completed by multiple users or over multiple searches. The search tool further may allow users to leverage the collected information and to use that information to help other users navigate through their searches.

While various embodiments have been described, it will be appreciated by those of ordinary skill in the art that modifications can be made to the various embodiments without departing from the spirit and scope of the present application as a whole.

What is claimed is:

1. A system for searching electronic records, comprising:
a data storage device comprising a database and a search tool; and
at least one processor connected to said data storage device for executing said search tool;
wherein said search tool is configured to:
communicate with a remote device via a network to receive a first search query having one or more search terms;

save the received first search query in the database;
communicate with the same or a different remote device to receive a second search query having one or more search terms;
save the received second search query in the database;
determine if the second search query is related to the first search query; and
if the second search query is related to the first search query, combine the saved search queries into a single search object;
wherein said search tool is further configured to:
generate a listing of first search results in response to the received first search query;
save the listing of first search results in association with the corresponding saved first search query;
generate a listing of second search results in response to the received second search query;
save the listing of second search results in association with the corresponding saved second search query; and
combine the listings of the first and second search results associated with the first and second saved search queries into said single search object if the second search query was determined to be related to the first search query; and
wherein said search tool is further configured to:
receive a user input via a web-based graphical user interface flagging, highlighting and/or annotating a selected one of the first and second saved search results; and
save the selected one of the first and second saved search results and the corresponding flag, highlight and/or annotation in association with the corresponding first or second saved search query; and
combine into said single search object the selected one of the first and second saved search results and the corresponding flag, highlight and/or annotation associated with the corresponding first or second saved search query if the second search query was determined to be related to the first search query.

2. The system for searching electronic records according to claim 1, wherein the search tool is further configured to save the single search object with a proprietary extension and to share in real-time the search object with other authorized users.

3. The system for searching electronic records according to claim 1, wherein said search tool is further configured to:
determine if the second search query is related to the first search query based on a semantic relationship of the search terms of the second search query to search terms of the first search query.

4. The system for searching electronic records according to claim 1, wherein said search tool is further configured to archive the single search object, wherein the archived single search object may be subsequently unarchived and reused.

5. The system for searching electronic records according to claim 1, wherein said search tool is further configured to:
determine if the second search query is related to the first search query based on a similarity of one or more of the second search results to one or more of the first search results.

6. The system for searching electronic records according to claim 1, wherein said search tool is further configured to:
cascade the second search query from the first search query, such that the second search results are limited to a subset of the first search results.

7. The system for searching electronic records according to claim 1, wherein said search tool is further configured to:
determine if the second search query is related to the first search query based on a correspondence of the flag, highlight and/or annotation associated with the first saved search query to the flag, highlight and/or annotation associated with the second search query.

8. The system for searching electronic records according to claim 1, wherein the search tool is further configured to:
add a citation to a selected search result and store the citation as metadata in the single search object.

9. The system for searching electronic records according to claim 1, wherein said search tool is further configured to:
create a search history map, wherein the search history map includes a record of all flagged pages and all annotations related to the first and/or second saved search query and the associated saved first and/or second search results; and
combine into said single search object the selected one of the first and second saved search results and the corresponding search history map if the second search query was determined to be related to the first search query.

10. The system for searching electronic records according to claim 1, wherein said search tool is further configured to:
generate a suggested search query in response to at least one of the received first and second search queries; and
combine into said single search object the generated suggested search queries, associated with the respective first and/or second search queries, if the second search query was determined to be related to the first search query.

11. A system for searching electronic records, comprising:
a data storage device comprising a database and a search tool; and
at least one processor connected to said data storage device for executing said search tool;
wherein said search tool is configured to:
communicate with a remote device via a network to receive a first search query having one or more search terms;
save the received first search query in the database;
generate a listing of first search results in response to the received first search query;
save the listing of first search results in association with the corresponding saved first search query;
communicate with the same or a different remote device to receive a second search query having one or more search terms;
save the received second search query in the database;
generate a listing of second search results in response to the received second search query;
save the listing of second search results in association with the corresponding saved second search query;
receive a user input via a web-based graphical user interface flagging, highlighting and/or annotating a selected one of the first and second saved search results;
save the selected one of the first and second saved search results and the corresponding flag, highlight and/or annotation in association with the corresponding first or second saved search query;
display on the remote device a visual map including visual indicators representing the first and second search queries that indicate whether the search results associated with the first and second search queries have been flagged, highlighted and/or annotated;

determine if the second search query is related to the first search query by comparing the search terms of the second search query to the search terms of the first search query and/or by comparing the listing of second search results with the listing of first search results and/or by comparing the flagging, highlighting and/or annotating of the second search results to the flagging, highlighting and/or annotating of the first search results; and if the second search query is related to the first search query, combine the saved search queries and their associated search results into a single search object.

12. The system for searching electronic records according to claim 11, wherein said search tool is further configured to:
determine if the second search query is related to the first search query based on a semantic relationship of the search terms of the second search query to search terms of the first search query.

13. The system for searching electronic records according to claim 11, wherein said search tool is further configured to:
determine if the second search query is related to the first search query based on a similarity of one or more of the second search results to one or more of the first search results.

14. The system for searching electronic records according to claim 11, wherein said search tool is further configured to:
cascade the second search query from the first search query, such that the second search results are limited to a subset of the first search results.

15. The system for searching electronic records according to claim 11, wherein said search tool is further configured to:
save the single search object with a proprietary extension and to share in real-time the search object with other authorized users.

16. The system for searching electronic records according to claim 11, wherein said search tool is further configured to:
archive the single search object, wherein the archived single search object may be subsequently reopened and reused.

17. The system for searching electronic records according to claim 11, wherein said search tool is further configured to:
display a dialog tool for receiving user input in response to dialog requests for information; and
use said user input to formulate and/or limit a search query, and/or to flag, highlight and/or annotate a search result, and/or to apply a criteria to the determination of whether the second search query is related to the first search query.

18. The system for searching electronic records according to claim 11, wherein said search tool is further configured to:
combine the saved search queries and their associated search results and associated flagging, highlighting and/or annotating of the search results into a single search object, if the second search query is related to the first search query.

\* \* \* \* \*